(12) United States Patent
Faenger et al.

(10) Patent No.: US 10,785,180 B2
(45) Date of Patent: Sep. 22, 2020

(54) CONTENT SUMMATION

(71) Applicant: Yahoo!, Inc., Sunnyvale, CA (US)

(72) Inventors: Jens Faenger, Santa Clara, CA (US); Michael Carey Wexler, Mountain View, CA (US)

(73) Assignee: Oath Inc., New York, NY (US)

( * ) Notice: Subject to any disclaimer, the term of this patent is extended or adjusted under 35 U.S.C. 154(b) by 28 days.

(21) Appl. No.: 14/736,658

(22) Filed: Jun. 11, 2015

(65) Prior Publication Data
US 2016/0364479 A1    Dec. 15, 2016

(51) Int. Cl.
G06F 17/20    (2006.01)
H04L 12/58    (2006.01)
G06F 16/738    (2019.01)

(52) U.S. Cl.
CPC ............ H04L 51/32 (2013.01); G06F 16/739 (2019.01)

(58) Field of Classification Search
CPC .................................................. G06F 17/30719
See application file for complete search history.

(56) References Cited

U.S. PATENT DOCUMENTS

| | | | | |
|---|---|---|---|---|
| 8,612,517 B1* | 12/2013 | Yadid | ............... | H04N 21/25891 |
| | | | | 709/201 |
| 9,092,829 B2* | 7/2015 | Fleischman | ........ | G06Q 30/0201 |
| 9,268,858 B1* | 2/2016 | Yacoub | ............... | G06F 16/9535 |
| 9,876,848 B1* | 1/2018 | Carroll | .................... | H04L 67/10 |
| 2006/0218573 A1* | 9/2006 | Proebstel | ............... | H04H 60/33 |
| | | | | 725/14 |
| 2007/0253678 A1* | 11/2007 | Sarukkai | ........... | G06F 17/30787 |
| | | | | 386/241 |
| 2008/0046406 A1* | 2/2008 | Seide | ................ | G06F 17/30743 |
| 2012/0166931 A1* | 6/2012 | Alonso | .............. | G06Q 30/0201 |
| | | | | 715/234 |
| 2012/0324491 A1* | 12/2012 | Bathiche | ................ | H04H 60/33 |
| | | | | 725/10 |
| 2013/0007057 A1* | 1/2013 | Li | ..................... | G06F 17/30265 |
| | | | | 707/769 |

(Continued)

OTHER PUBLICATIONS

Lian, et al. "Automatic Video Thumbnail Selection", 2011, pp. 242-245, http://ieeexplore.ieee.org/cart/download.jsp?partnum=6002001&searchProductType=IEEP%20Conferences.

(Continued)

*Primary Examiner* — Shahid K Khan
(74) *Attorney, Agent, or Firm* — Cooper Legal Group, LLC

(57) ABSTRACT

As provided herein, a user of a client device is identified as viewing content (e.g., a movie) and generating user signals related to the content (e.g., a social network post about the movie). An expression of interest may be determined from the user signals (e.g., the user may write "this scene is amazing!" within the social network post). Responsive to the expression of interest exceeding an interest threshold, a timestamp is generated for a portion of the content occurring at a time corresponding to the expression of interest. A segment is extracted from the content based upon the timestamp. Summary content, such as a trailer or a summary video for the movie that depicts relatively interesting segments of the movie, is generated to comprise the segment and/or other segments. Users may view the summary content in order to obtain a brief overview of relatively interesting portions of the movie.

20 Claims, 9 Drawing Sheets

(56) References Cited

U.S. PATENT DOCUMENTS

| | | | | |
|---|---|---|---|---|
| 2013/0007787 A1* | 1/2013 | John | ................ | H04N 21/42203 |
| | | | | 725/10 |
| 2013/0326575 A1* | 12/2013 | Robillard | ............ | G11B 27/034 |
| | | | | 725/116 |
| 2013/0346330 A1* | 12/2013 | Fleischman | ........ | G06Q 30/0201 |
| | | | | 705/319 |
| 2014/0280879 A1* | 9/2014 | Skolicki | .................. | H04L 69/28 |
| | | | | 709/224 |
| 2014/0282651 A1* | 9/2014 | Baratz | .................. | H04N 21/222 |
| | | | | 725/13 |
| 2015/0185965 A1* | 7/2015 | Belliveau | ............ | G11B 27/031 |
| | | | | 715/723 |

OTHER PUBLICATIONS

Rav-Acha, et al., "Making a Long Video Short: Dynamic Video Synopsis", Proceedings of the 2006 IEEE Computer Society Conference on Computer Vision and Pattern Recognition, 2006, pp. http://citeseerx.ist.psu.edu/viewdoc/summary?doi=10.1.1.123.5439.

Liang, Yu-Ming, "Video Condensation for Video Forensics", 2012, pp. 180-184, http://ieeexplore.ieee.org/xpl/articleDetails.jsp?arnumber=6381642.

\* cited by examiner

CONTENT SUMMATION

BACKGROUND

A user may have an interest in watching various types of content, such as a new television show, a particular action movie, a sporting event, etc. However, the user may lack the available time to view content, such as the action movie, in the entirety. Thus, the user may forego watching the action movie, or may seek out summaries or opinions for the action movie. In an example, the user may ask friends, family, and/or others for opinions about the action movie. In another example, the user may read a review of the action movie through a movie review website or application. In another example, the user may record the action movie and/or attempt to skim through scenes of the action movie, such as by fast forwarding to portions that might seem interesting. Unfortunately, the user may be unable to identify relatively interesting portions of the action movie, and thus may forgo consumption of the action movie.

SUMMARY

In accordance with the present disclosure, one or more systems and/or methods for summarizing content are provided. In an example, the content (e.g., audio content, visual content, written content, etc.) being viewed by a user on a client device may be identified. User signals related to the content may be identified. The user signals may comprise comments related to the content (e.g., "that was great!" or "that was boring"), ratings or reviews for the content (e.g., "the chase scene in the content was epic!"), sharing of the content, operation of the content (e.g., rewinding the content, stopping the content, pausing the content, etc.). An expression of interest (e.g., the user posting a comment about a favorite scene of a comic book movie that the user is currently viewing) may be determined from the user signals, relative to the content. In an example, the expression of interest may comprise a user signal that indicates positive interest in the content (e.g., "that was great" rather than "that was boring"). The expression of interest may be determined by identifying a substance of the user signals and a time that the user signals were created, relative to the content (e.g., the user may post "this is an awesome scene!!" through a social network while watching the comic book movie).

An interest threshold may be exceeded by identifying a threshold number of expressions of interest occurring at the time relative to the content (e.g., a threshold number of users may express an interest in the scene of the comic book movie through social networks posts). For example, the interest threshold may be exceeded by identifying a second user and/or other users that generated the expression of interest for the scene. A weight may be applied to the expression of interest, based upon the identification of the second user and/or other users, to create a weighted expression of interest (e.g., a relatively greater weight may be applied to the expression of interest based upon the second user being a well known critic, based upon more users expressing interest in the scene, etc.). The weighted expression of interest may be determined to exceed the interest threshold. Responsive to the expression of interest exceeding the interest threshold, a timestamp may be generated for a portion of the content occurring at the time corresponding to the expression of interest (e.g., the timestamp may indicate that the scene of the comic book movie may be relatively interesting to users).

A segment may be extracted from the content based upon the timestamp (e.g., the scene for which the threshold number of users expressed interest). A starting time of the segment may be determined based upon the starting time corresponding to a first transition in the content (e.g., a change in mood, a pause in a conversation, a pause in a monologue, a pause in a song, etc.). The first transition may correspond to a lull time in the content where an output (e.g., audio, visual, etc.) is below a threshold word output rate. The output being below the threshold word output rate may identify a pause in the content (e.g., a time when actors, announcers, etc., are not talking, when no lyrics are being sung, etc.). An ending time of the segment may be determined based upon the ending time corresponding to a second transition in the content (e.g., when the output is below the threshold word output rate). Summary content (e.g., closed captioning, audio output, visual output corresponding to a condensed version of the content, a trailer, etc.) comprising the segment may be generated. Responsive to a second expression of interest exceeding the interest threshold, a second timestamp may be generated for a second portion of the content occurring at a second time corresponding to the second expression of interest. A second segment may be extracted from the content based upon the second timestamp. The summary content may be generated to comprise the segment and the second segment. In this way, summary content may comprise relatively interesting scenes of the action movie, and thus may provide a user with a relatively condensed version of the action movie.

One or more messages comprising the expressions of interest may be identified. The one or more messages may be aggregated and presented, with the summary content, to a viewing user. A social media associate of the viewing user may generate social expressions of interest related to the content. The social expression of interest and the summary content may be presented to the viewing user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
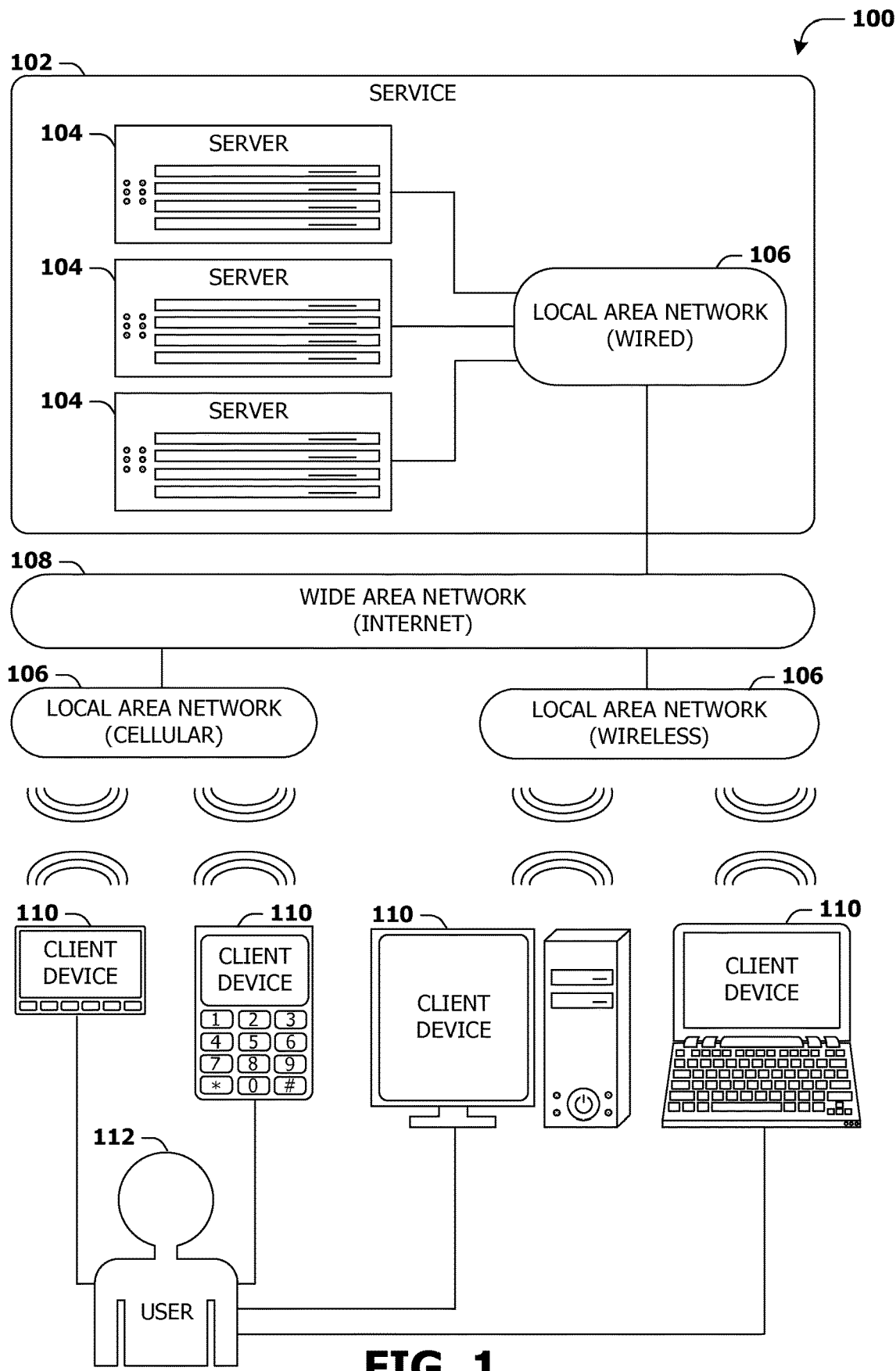
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
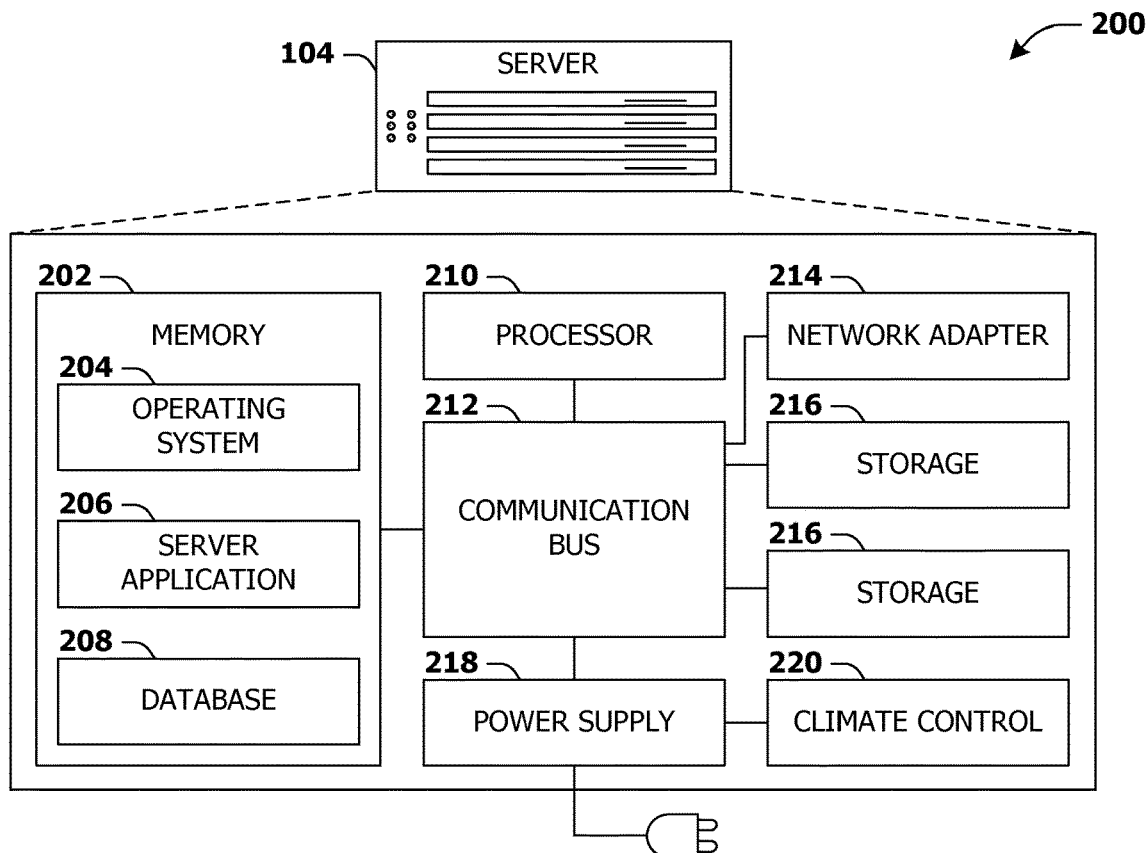
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
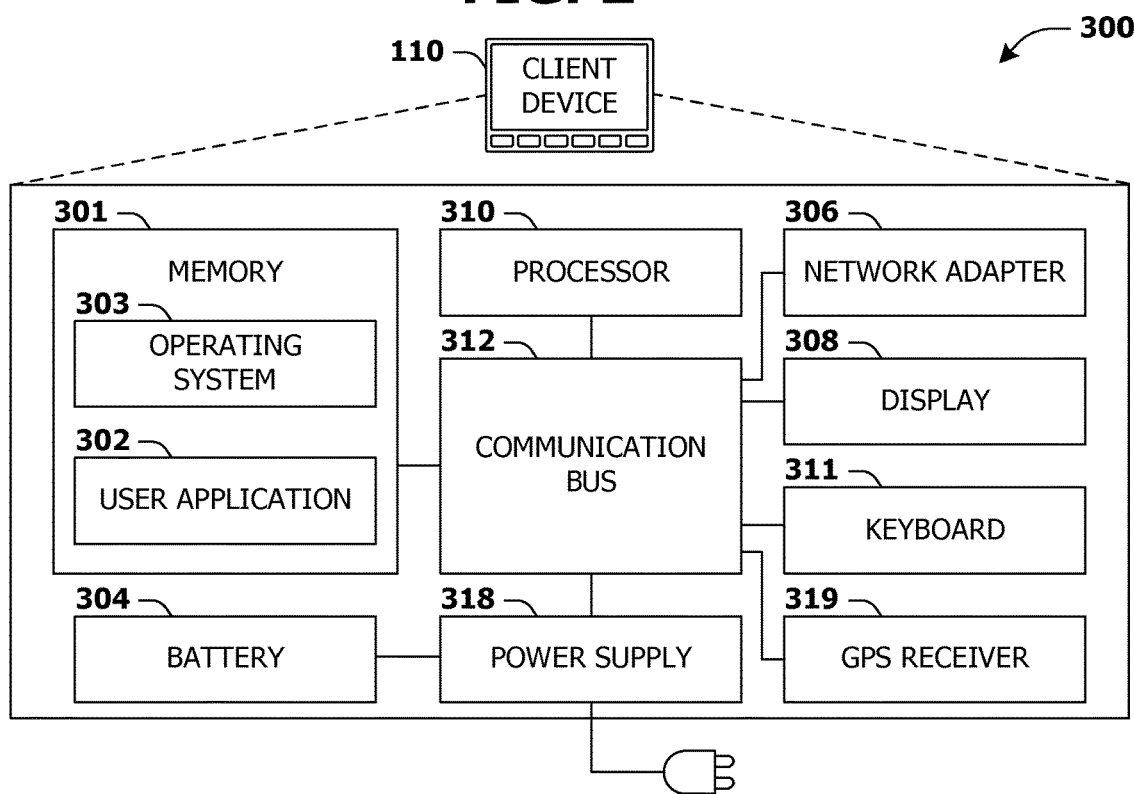
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., a web browser or live video application), descriptive content in the form of signals or stored physical states within memory (e.g., an email address, instant messenger identifier, phone number, postal address, message content, date, and/or time) may be identified. Descriptive content may be stored, typically along with contextual content. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for summarizing, tagging and/or indexing content are provided. Some traditional summarizing techniques may lack an effective mechanism to identify interesting portions of content (e.g., audio content, visual content, written content, etc.), making summarization of the content incomplete and/or uninteresting.

As provided herein, summary content may be generated for content, such as a movie or video, based upon commentary provided by users that are viewing the content. For example, a user may be watching a documentary. While watching the documentary, the user may publish a social network post "this scene is amazing" and/or may perform other expressions of interest for the documentary (e.g., generating a comment, text messaging a friend about the scene, sharing a link to the documentary, etc.). In this way, segments of the content that may be relatively interesting may be identified based upon when the expressions of interest occur relative to the user viewing the documentary.

In this way, the summary content may comprise relatively interesting portions of the documentary that may highlight and/or summarize the documentary for users that may otherwise lack the time to view the documentary in the entirety.

Figure 4:
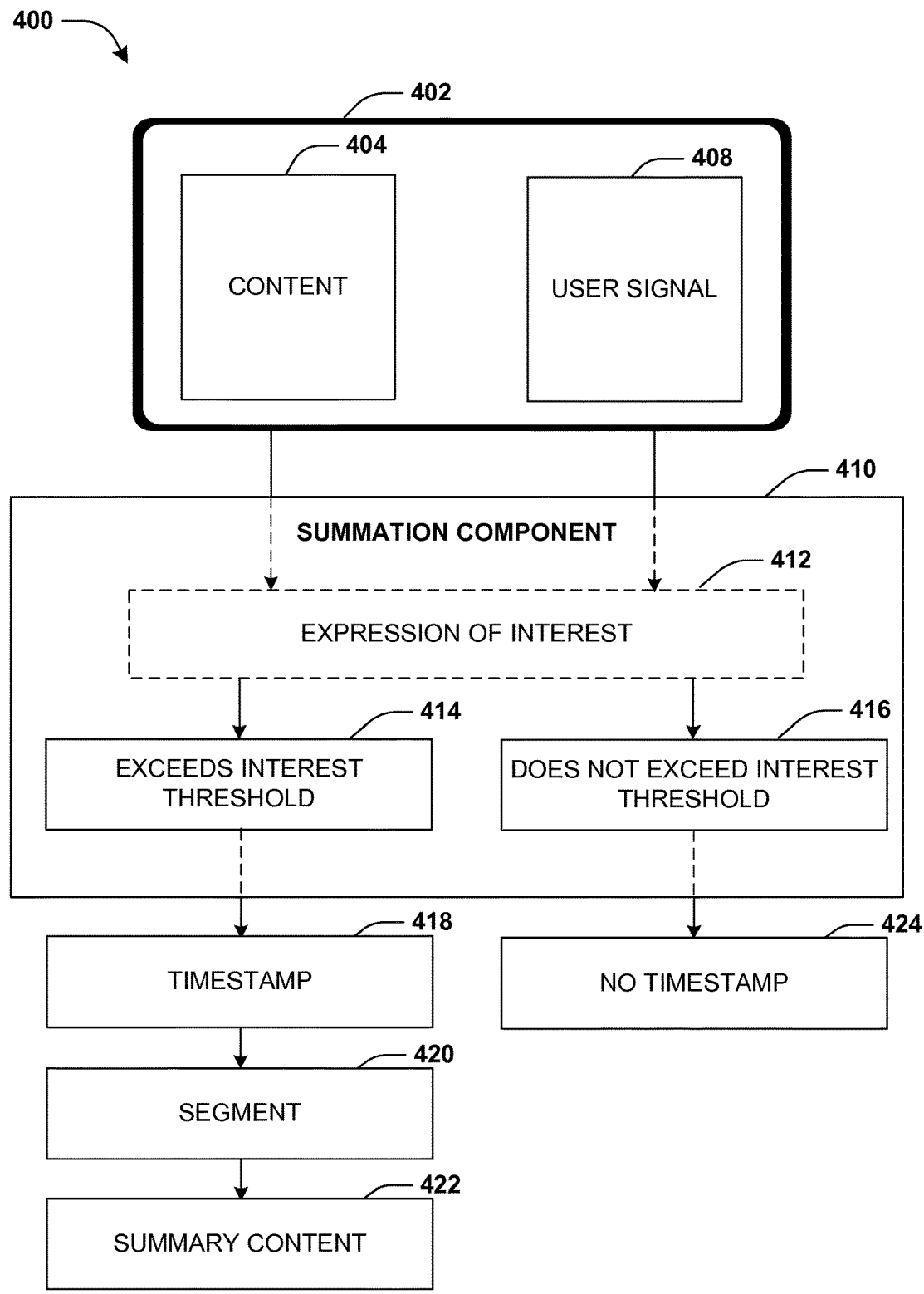
FIG. 4 is a component block diagram illustrating an example system for generating summary content.

FIG. 4 is an illustration of a component block diagram illustrating an example system 400 for content summation utilizing a summation component 410. A user may view content 404 (e.g., audio content, visual content, written content, etc.) on a client device 402. In an example, the user may be watching a Superhero Movie on a laptop computer. The user may generate a user signal 408 related to the content 404. In an example, the user signal 408 may comprise a post to a social network, a text message, scrubbing the content 404, leaving a comment, etc.). The content 404 and the user signal 408 may be provided to the summation component 410. In an example, the user signal 408 and/or the content 404 may comprise an expression of interest 412. In an example, the expression of interest 412 may comprise comments related to the content 404, ratings or reviews for the content 404, sharing of the content 404, operation of the content 404 (e.g., rewinding the content 404, pausing the content 404, stopping the content 404, etc.). In an example, the user may post a comment stating "wow, did you see that!" referring to a portion of the Superhero movie where an epic battle is occurring.

The expression of interest 412 may be determined by identifying substance of the user signal 408 (e.g., whether the substance of the user signal 408 is positive or negative relative to the content). For example, based upon the comment being negative (e.g., "well, that was boring") the comment may not comprise the expression of interest 412 (e.g., because the comment is not indicative of an interesting portion of the content 404). In an example, the user signal 408 may be determined to be negative based upon the user abandoning the Superhero movie, stopping the Superhero movie, closing the application in which the user is viewing the Superhero movie, leaving a webpage on which the user is viewing the Superhero movie, etc. In contrast, a positive comment (e.g., "wow, did you see that!") and/or replaying a portion of the Superhero movie may be indicative of an interesting portion of the content 404. The summation component 410 may determine a time that the expression of interest 412 was created relative to the content 404 (e.g., the user may have created the comment "wow, did you see that!" at a 2 hour and 20 minute mark of the Superhero movie).

In an example, an interest threshold may be exceeded 414 by identifying a threshold number of expressions of interest 412 occurring at the time relative to the content 404. In another example, if the interest threshold specifies that 10 expressions of interest or more are to occur within a time period (e.g., a 3 minute period, or some other time period), then the interest threshold may be not be exceeded 416 where merely 2 expressions of interest are created between 55 minutes to 58 minutes relative to a starting time of the content 404. Responsive to a number of expressions of interest not exceeding 416 the interest threshold, no timestamp 424 may be generated.

In an example, if the interest threshold specifies that 25 expressions of interest or more are to occur within the time period, then the interest threshold may be exceeded 414 based upon 30 expressions of interest being created between about 20 minutes to about 22 minutes relative to the starting time of the content 404. The interest threshold may be exceeded 414 by identifying a second user and/or other users generating the expression of interest 412. The summation component 410 may apply a weight to the expression of interest 412, based upon the identification of the second user and/or other users, to create a weighted expression of interest (e.g., the second user may be a critic, registered user, a trusted user, etc.).

The summation component 410 may apply the weight to the expression of interest 412 based upon a type of expression (e.g., sharing of the content 404, commenting on the content 404, replaying of the content 404, etc.). In an example, the weight may be based upon an intended viewing user. In an example, the weight may be altered based upon the intended viewing user comprising a child, an adult, a viewing user residing in a particular part of a country, (e.g., a southern part of the country, a western part of the country, etc.), etc. For example, responsive to the intended viewing user residing in the southern part of the county, a comment generated by a southern user residing in the southern part of the country may be weighted more highly than a comment by a northern user residing in a northern part of the country.

In another example, if the interest threshold specifies that 10 expressions of interest or more are to occur within the time period, then the interest threshold may be not be exceeded 416 based upon 6 expressions of interest being created within the timeframe. However, the interest threshold may be exceeded 414 if one or more of the 6 expressions of interest comprise weighted expressions of interest that provide for an overall weighted number of expressions that exceed the interest threshold 414. For example, if one of the 6 expressions of interest 412 is weighed at a 5× weight (e.g., that one expression of interest 412 may be counted as 5 expressions of interest), then the total number of expressions of interest 412 may equal 11, which may exceed 414 the interest threshold. Responsive to the expression of interest exceeding 414 the interest threshold, a timestamp 418 may be generated for a portion of the content 404 occurring at the time corresponding to the expression of interest 412 (e.g., the comment may have been created 20 minutes into the movie).

In an example, 10 portions of the content 404 may be identified as comprising 10 interesting portions of the content. In an example, the 10 interesting portions of the content 404 may be identified based on the 10 interesting portions having a higher weighted score as compared to all portions of the content 404 having a weighted score. For example, a first interesting portion may have a first weighted score (e.g., a highest weighted score), a second interesting portion may have a second weighted score (e.g., a second highest weighted score), etc. Responsive to identifying the 10 interesting portions of the content 404 based upon weighted scores, 10 corresponding timestamps may be identified.

The summation component 410 may extract a segment 420 from the content 404 based upon the timestamp 418. A starting time of the segment 420 may be determined based upon the starting time corresponding to a first transition in the content (e.g., a breaking point in the content, such as an end of a scene or a lull in an action scene). The first transition may correspond to a lull time in the content 404 where an output (e.g., audio, visual, etc.) is below a threshold word output rate. The output being below the threshold word output rate may identify a pause in the content 404 (e.g., a time when actors, announcers, etc., are not talking, when no lyrics are being sung, etc.). In an example, the timestamp 418 may indicate that the portion starts at 45 minutes 21 seconds (45:21). In an example, if the content 404 comprises a sporting event, then 45:21 may denote an excellent catch. However, the user may find it interesting to see the throw (e.g., the starting time of the segment 420 may be at the start of a play). Additionally, 45:21 may interrupt an announcer, referee, etc. mid-word or mid-sentence, rendering a segment starting at 45:21 confusing. The summation component 410 may alter the starting time of the segment 420, relative to the starting time of the portion, to expand the segment in order to mitigate interruptions and/or confusion (e.g., by utilizing a scene detection algorithm, a feature based algorithm, etc.). An ending time of the segment 420 may be determined based upon the ending time corresponding to a second transition (e.g., an end to a scene of the segment, when the output is below the threshold word output rate, etc.).

The summation component 410 may generate summary content 422 (e.g., closed captioning, audio output, and/or visual output corresponding to the segment, a trailer, a condensed version of the content 404, etc.) comprising the segment 420. The summation component 410 may present the summary content 422 to a viewing user.

Figure 5:
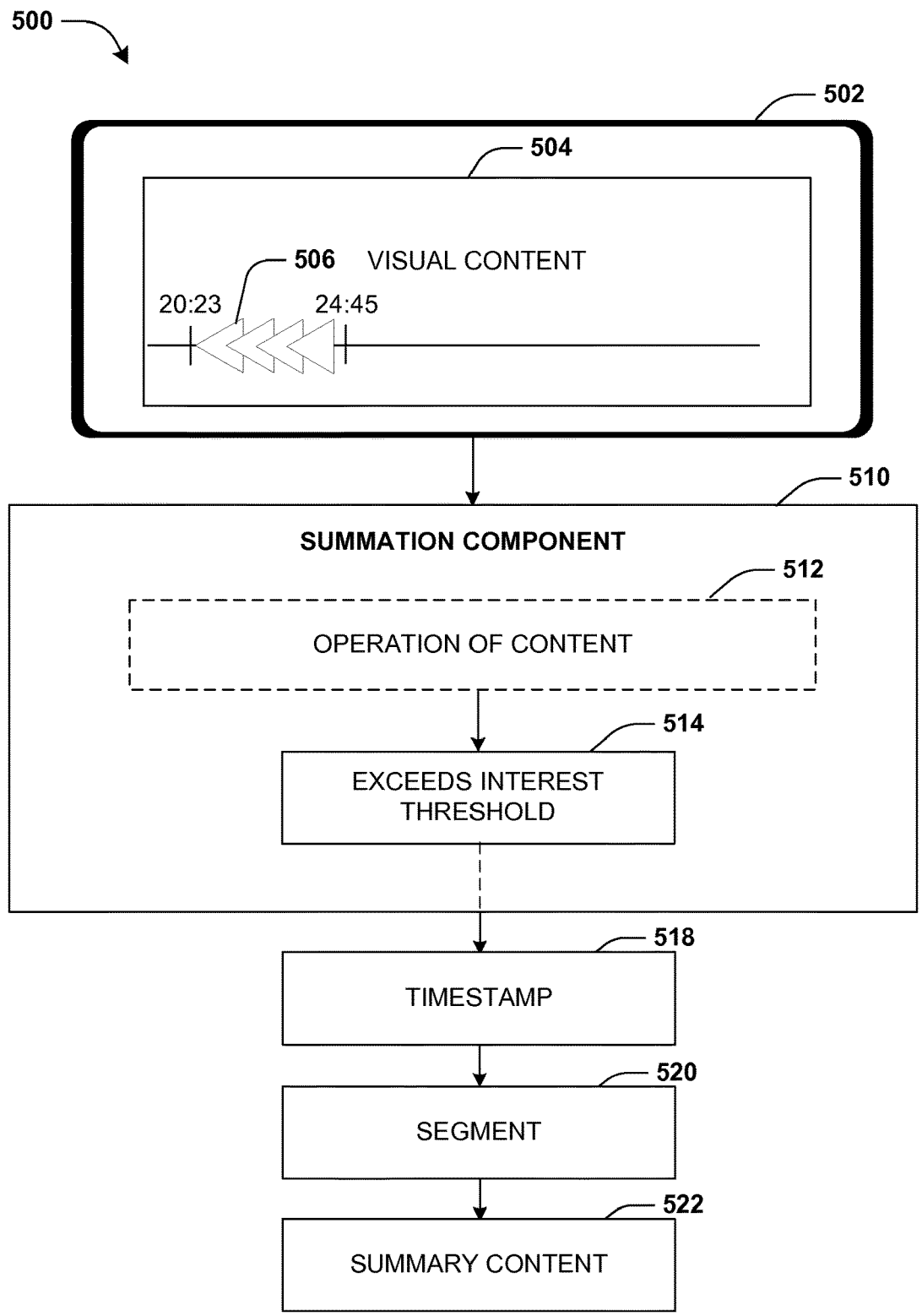
FIG. 5 is a component block diagram illustrating an example system for generating summary content, where operation of content comprises an expression of interest.

FIG. 5 is an illustration of a component block diagram illustrating an example system 500 for content summation utilizing a summation component 510. A user may view visual content 504 on a client device 502. The user may rewind 506 the content 504 (e.g., from a time of 24 minutes and 45 seconds (24:45) to a time of 20 minutes and 23 seconds (20:23)). An operation of the content 512 (e.g., the rewind 506) may be provided to the summation component 510. The summation component 510 may identify the operation of the content 512 as an expression of interest. For example, the user rewinding 506 the visual content 504 may indicate that a first portion of the visual content 504 may have been interesting (e.g., because the user found the first portion interesting enough that the user wanted to watch it twice). In an example, fast forwarding through a second portion may be indicative that the second portion is uninteresting. The summation component 510 may determine that the fast forward comprises a negative action and is not an expression of interest. In an example, the summation component 510 may be provided with one or more additional expressions of interest between 20:23 and 24:45. The summation component 510 may determine that the operation of the content 512 and/or the one or more additional expressions of interest exceed 514 an interest threshold.

Responsive to the expression of interest exceeding 514 the interest threshold, a timestamp 518 may be generated for a portion of the visual content 504 occurring at the time corresponding to the expression of interest. The summation component 510 may extract a segment 520 from the visual content 504 based upon the timestamp 518 (e.g., the segment 520 may correspond to the first portion of the visual content 504 that the user watched twice). The summation component 510 may generate summary content 522 comprising the segment 520.

Figure 6:
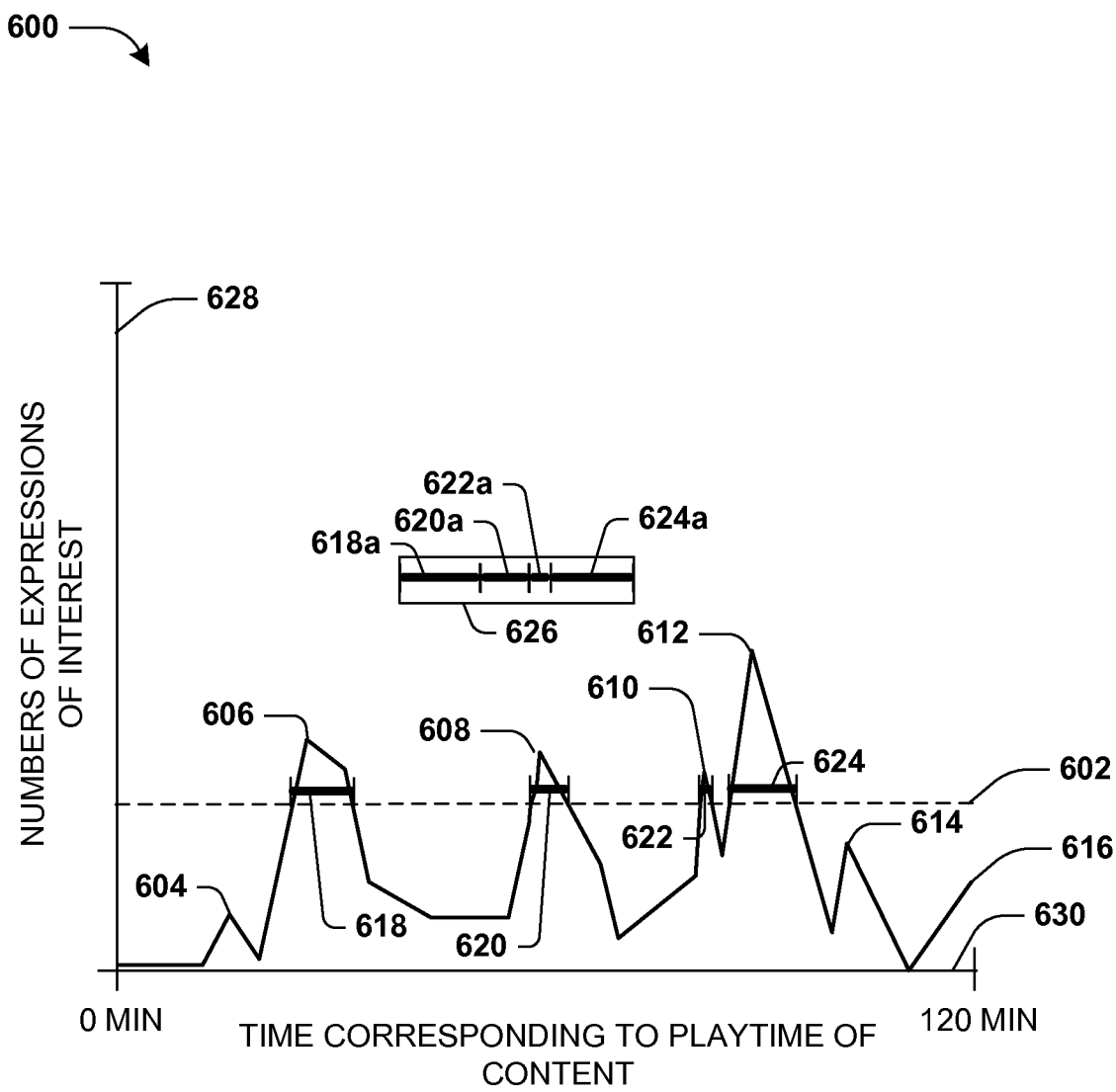
FIG. 6 is a component block diagram illustrating an example system for generating summary content, where expressions of interest are determined to exceed an interest threshold.

FIG. 6 illustrates a graphical representation 600 comprising numbers of expressions of interest on a y-axis 628 and time corresponding to playtime of the content on an x-axis 630. In an example, the content may have a duration of 120 minutes. The time may correspond to a running time of the content (e.g., from 0 minutes to 120 minutes). A solid line 616 may represent a linear function corresponding to the number of expressions of interest relative to the time. A dashed line 602 may represent an interest threshold. A first peak 604 in the solid line 616 may not exceed the interest threshold. A second peak 606 may exceed the interest threshold. In an example, the second peak 604 may exceed the interest threshold at 20 minutes and drop below the interest threshold at 36 minutes (e.g., a threshold number of users may express interest in the content between 20 and 36 minutes into the content, such as by posting positive social network posts about the content). A first portion 618 of the content may be identified based upon a first duration (e.g., relative to the time) that the second peak 606 remains over the interest threshold.

In an example, responsive to a second expression of interest exceeding the interest threshold (e.g., a third peak 608), a second time (e.g., between 48 minutes to 52 minutes) may be generated for a second portion 620 of the content. The second portion 620 may be identified based upon a second duration that the third peak 608 remains over the interest threshold. In an example, a fourth peak 610 may exceed the interest threshold at 72 minutes and drop below the interest threshold at 74 minutes. A third portion 622 may be identified based upon a third duration that the fourth peak 610 remains over the interest threshold. In an example, a fifth peak 612 may exceed the interest threshold at 76 minutes and drop below the interest threshold at 84 minutes. A fourth portion 624 may be identified based upon a fourth duration that the fifth peak 612 remains over the interest threshold. A sixth peak 614 may not exceed the interest threshold.

The first portion 618 may be extracted from the content as a first segment 618*a*, the second portion 620 may be extracted from the content as a second segment 620*a*, the third portion 622 may be extracted from the content as a third segment 622*a* and/or the fourth portion 624 may be extracted from the content as a fourth segment 624*a*. The segments 618*a*, 620*a*, 622*a*, 624*a* may be combined to generate summary content 626. In this way, a user may view the summary content 626 in order to watch relatively interesting portions of the content (e.g., 10 minutes of highlights).

Figure 7:
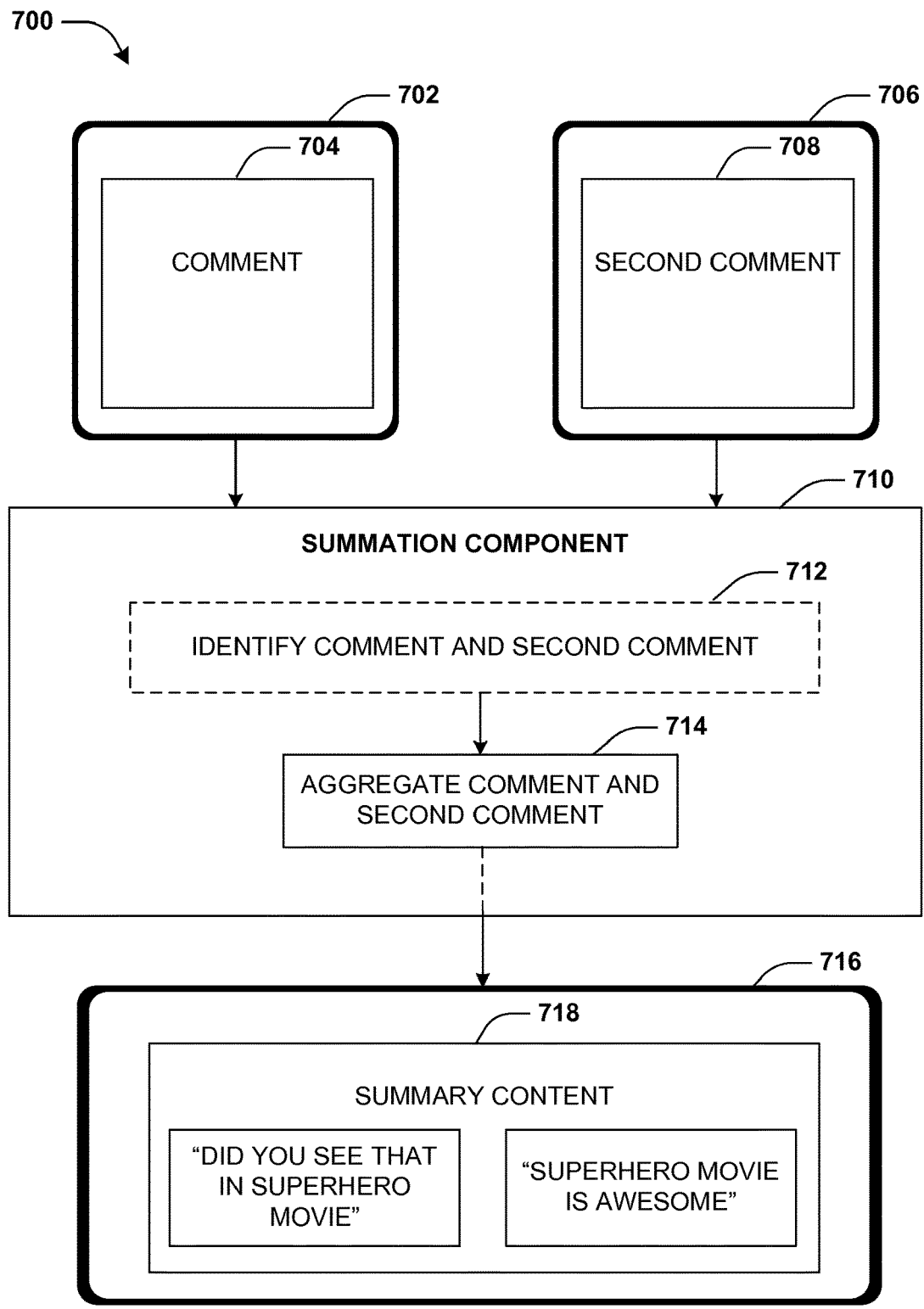
FIG. 7 is a component block diagram illustrating an example system for generating summary content, where one or more messages are aggregated.

FIG. 7 is an illustration of a component block diagram illustrating an example system 700 for content summation utilizing a summation component 710, where one or more messages are aggregated. A user viewing content, on a client device 702, may generate a comment 704 (e.g., "did you see that in Superhero Movie") and a second user viewing the content, on a second client device 706, may generate a second comment 708 (e.g., "Superhero Movie is awesome"). The summation component 710 may identify 712 the comment 704 and the second comment 708. In an example, the summation component 710 may identify the comment 704 as corresponding to a segment of the content, and the second comment as corresponding to a second segment of the content. The summation component 710 may aggregate 714 the comment 704 and the second comment 708 to create summary content 718. The summation component 710 may provide the comment 704, the second comment 708, and/or the summary content 718 to a viewing user through a third client device 716. In an example, the comment 704, corresponding to the segment, may be presented to the viewing user before, during, and/or after the segment is presented, and the second comment 708, corresponding to the second segment, may be presented to the viewing user before, during, and/or after the second segment is presented. In an example, the comment 704 and/or the second comment 708 may be presented to the viewing user at a same/similar time.

Figure 8:
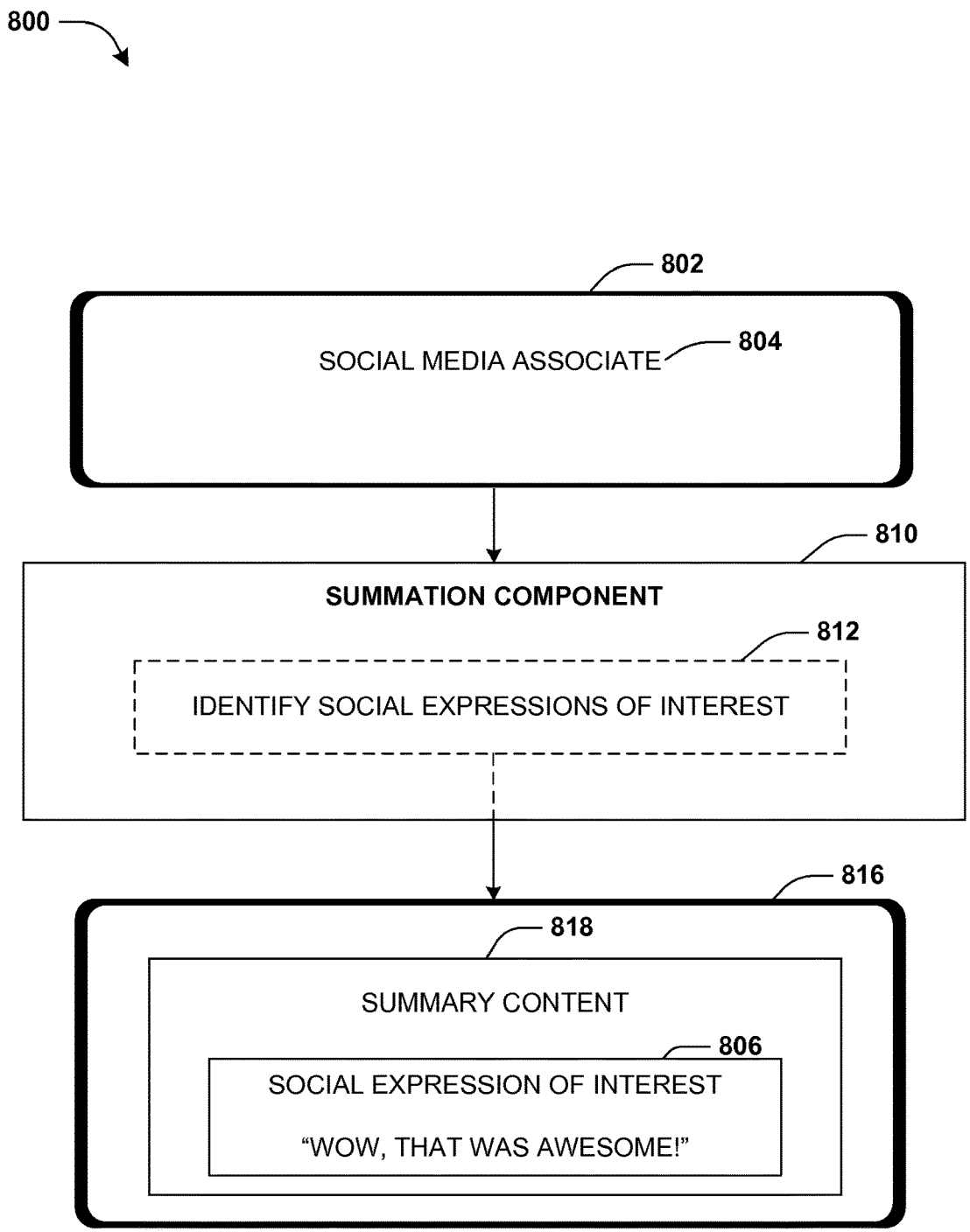
FIG. 8 is a component block diagram illustrating an example system for generating summary content, where a social expression of interest of a social media associate is presented to a viewing user.

FIG. 8 is an illustration of a component block diagram illustrating an example system 800 for content summation utilizing a summation component 810, where a social media associate 804 (e.g., a social network friend) of a viewing user is identified. The social media associate of the viewing user may be viewing content on a client device 802. The social media associate 804 may generate a social expression of interest 806 in the content (e.g., a social network post expressing interest in the content). The social expression of interest 806 may be identified 812 by the summation component 810. The summation component 810 may provide the social expression of interest 806 (e.g., "Wow, that was awesome!"), along with summary content 818 to the viewing user on a viewing client device 816. The social expression of interest 806 may be presented with a segment that corresponded to a timestamp associated with the social expression of interest 806 (e.g., when the social expression of interest 806 was generated).

Figure 9:
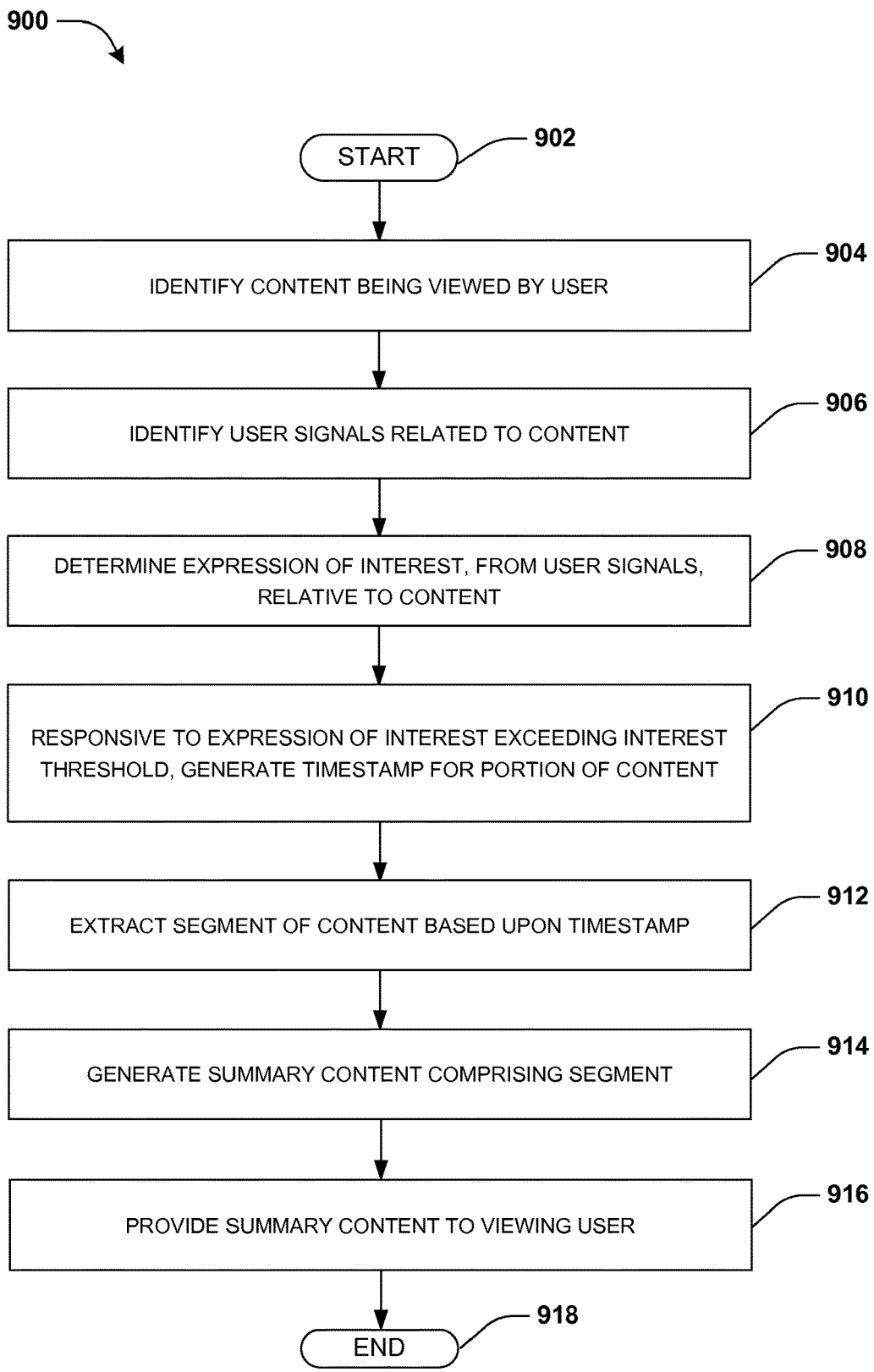
FIG. 9 is a flow chart illustrating an example method of providing summary content based upon expressions of interest.

An embodiment of content summation is illustrated by an example method 900 of FIG. 9. At 902, the method 900 starts. At 904, content, being viewed by a user, may be identified. At 906, user signals, related to the content, may be identified. The user signals may be generated by the user (e.g., a social network post). At 908, an expression of interest may be determined, from the user signals, relative to the content (e.g., the social network post may express an interest of the user in the content). At 910, responsive to the expression of interest exceeding an interest threshold, a timestamp may be generated for a portion of the content. At 912, a segment may be extracted from the content based on the timestamp. At 914, summary content may be generated based upon the segment. At 916, the summary content may be provided to a viewing user. At 918, the method 900 ends.

Figure 10:
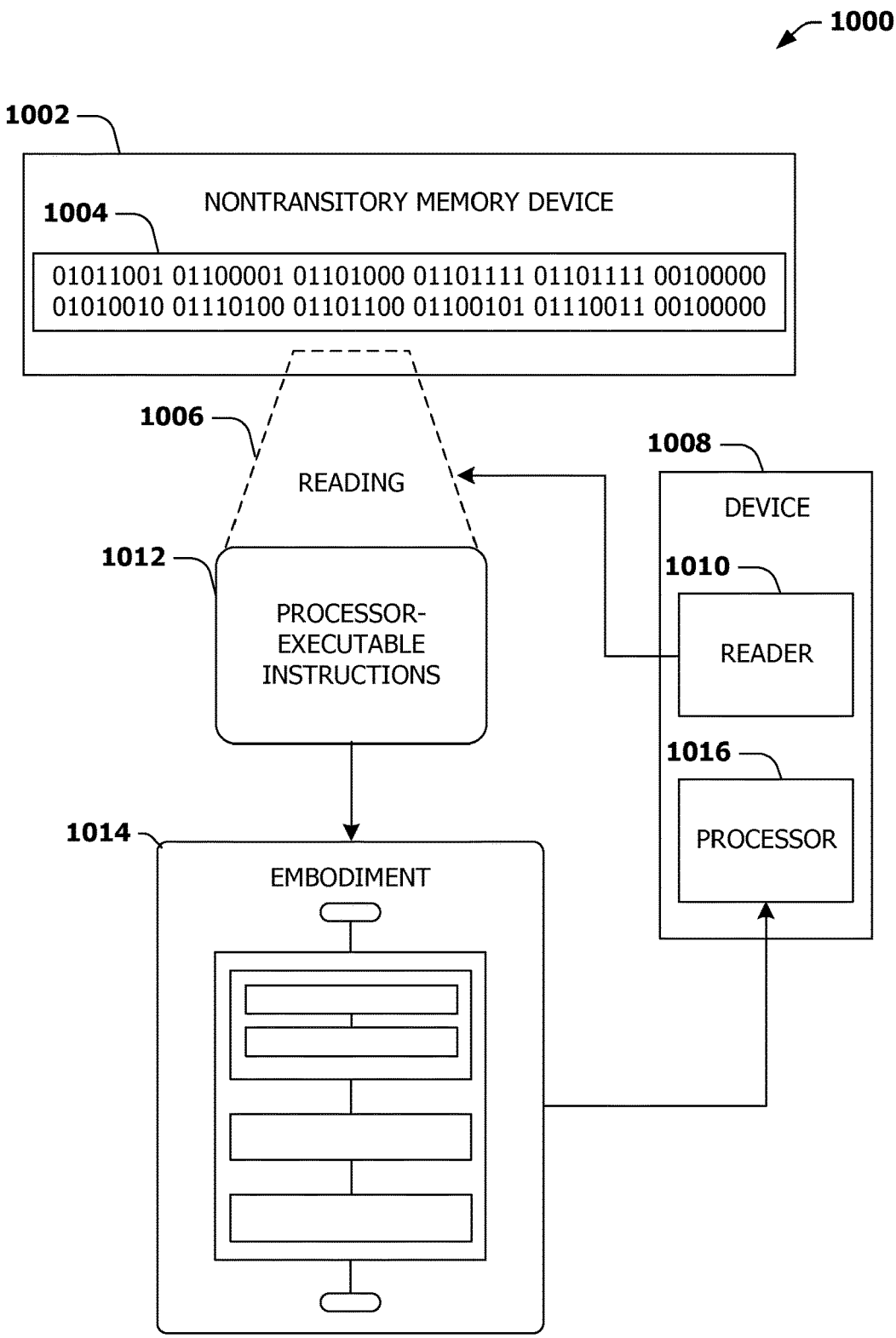
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 900 of FIG. 9, for example. In some embodiments, the processor-executable instructions, when executed on the processor 1016 of the device 1008, are configured to implement a system, such as at least some of the example system 400 of FIG. 4, at least some of the example system 500 of FIG. 5, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system of content summation, comprising:
a processor; and
memory comprising processor-executable instructions that when executed by the processor cause the processor to be configured to implement a summation component configured to:
identify content, comprising video, being viewed by a user on a client device;
identify user signals, comprising at least one of a post to a social network or a text message, related to the content and generated, using a second device different than the client device, while the video was played on the client device, the content provided to the user on the client device from a first source comprising a content hosting platform and the user signals accessed from a second source comprising a communication platform through which the user transmitted the user signals from the second device;
responsive to determining that the user signals are related to the content and were generated while the video was played on the client device, determine whether substance of one or more of the user signals is positive or negative relative to the content;
determine one or more expressions of interest, from the user signals, relative to the content responsive to determining that substance of at least one user signal of the user signals is positive relative to the content;
responsive to the one or more expressions of interest exceeding an interest threshold corresponding to a threshold number of expressions of interest within a time period defined by the interest threshold, generate a timestamp for a portion of the content occurring at a time corresponding to the one or more expressions of interest exceeding the interest threshold;
determine a starting time of a segment of the content based upon the timestamp for the portion of the content and an identification of a first transition in the content;
determine an ending time of the segment based upon the timestamp for the portion of the content and an identification of a second transition in the content;
extract the segment; and
generate summary content comprising the segment.

2. The system of claim 1, the summation component configured to:
determine that a first expression of interest of the one or more expressions of interest is associated with a first type of expression;
apply a first weight to the first expression of interest based upon the first type of expression;
determine that a second expression of interest of the one or more expressions of interest is associated with a second type of expression different than the first type of expression; and
apply a second weight to the second expression of interest based upon the second type of expression.

3. The system of claim 2, the first type of expression corresponding to sharing associated with the content.

4. The system of claim 2, the first type of expression corresponding to commenting associated with the content.

5. The system of claim 2, the first type of expression corresponding to replaying associated with the content.

6. The system of claim 1, the summation component configured to determine the ending time by:
identifying at least one time in the content where an audio output is below a threshold word output rate.

7. The system of claim 1, at least one of the user signals not a comment on the content.

8. The system of claim 1, at least one of:
the first transition or the second transition corresponding to a lull time in the content where an audio output is below a threshold word output rate.

9. The system of claim 1, the content not modified by at least one of the user signals.

10. The system of claim 1, the content hosting platform comprising a website hosting one or more videos, the communication platform comprising at least one of the social network or a text messaging platform.

11. The system of claim 1, the summation component configured to:
identify one or more messages comprising the one or more expressions of interest;
aggregate the one or more messages; and
present the one or more messages and the summary content to a viewing user.

12. The system of claim 1, the summation component configured to:
identify a social media associate of a viewing user;
identify one or more social expressions of interest, related to the content, generated by the social media associate; and
present the one or more social expressions of interest and the summary content to the viewing user.

13. The system of claim 1, the summation component configured to:
responsive to a second expression of interest exceeding the interest threshold, generate a second timestamp for a second portion of the content occurring at a second time corresponding to the second expression of interest;
extract a second segment of the content based upon the second timestamp; and
generate the summary content to comprise the segment and the second segment.

14. A method of content summation, comprising:
identifying content, comprising video, being viewed by a user on a client device;
identifying user signals related to the content and generated while the video was played on the client device, the content provided to the user from a first source and the user signals accessed from a second source different than the first source, the first source associated with a content hosting platform and the second source associated with a communication platform;
responsive to determining that the user signals are related to the content and were generated while the video was played on the client device, determine whether substance of one or more of the user signals is positive or negative relative to the content;
determining one or more expressions of interest, from the user signals, relative to the content responsive to determining that substance of at least one user signal of the user signals is positive relative to the content;
responsive to the one or more expressions of interest exceeding an interest threshold corresponding to a threshold number of expressions of interest within a time period, generating a timestamp for a portion of the content occurring at a time corresponding to the one or more expressions of interest exceeding the interest threshold;
determining a starting time of a segment of the content based upon the timestamp for the portion of the content;
determining an ending time of the segment based upon the timestamp for the portion of the content, the starting time different than the ending time;
extracting the segment;
generating summary content comprising the segment; and
providing the summary content to a viewing user.

15. The method of claim 14, the identifying content comprising identifying at least one of audio content, visual content, or written content.

16. The method of claim 14, the identifying user signals comprising identifying at least one of a comment related to the content, a rating of the content, sharing of the content, or operation of the content.

17. The method of claim 14, comprising:
determining that the one or more expressions of interest exceed the interest threshold by:
identifying a second user generating the expression of interest;
applying a weight to the expression of interest, based upon the identification of the second user, to create a weighted expression of interest;
identifying a number of expressions of interest occurring at the time relative to the content; and
determining that the weighted expression of interest aggregated with the number of expressions of interest exceeds the interest threshold.

18. The method of claim 14, comprising:
determining the starting time based upon the starting time corresponding to a first transition in the content; and
determining the ending time based upon the ending time corresponding to a second transition in the content, at least one of the first transition or the second transition corresponding to a lull time in the content where an audio output is below a threshold word output rate.

19. A system for tagging interesting segments of content comprising:
a processor; and
memory comprising processor-executable instructions that when executed by the processor cause the processor to be configured to implement, on a server, a summation component configured to:
identify content, comprising video, being viewed by a plurality of users on a plurality of client devices, wherein the server is connected to each of the plurality of client devices via a network connection;
identify user signals associated with segments of the content and generated while the video was played on the plurality of client devices, the content provided to a user from a first source and the user signals accessed from a second source different than the first source;
responsive to determining that the user signals are related to the content and were generated while the video was played on the plurality of client devices, determine whether substance of one or more of the user signals is positive or negative relative to the content;
determine one or more expressions of interest, from the user signals, relative to the content responsive to determining that substance of at least one user signal of the user signals is positive relative to the content;
determine that a first expression of interest of the one or more expressions of interest is associated with a first type of expression corresponding to sharing the content;
apply a first weight to the first expression of interest based upon the first type of expression to generate a first weighted expression of interest;
determine that a second expression of interest of the one or more expressions of interest is associated with a second type of expression, corresponding to at least one of commenting on the content or replaying the content, different than the first type of expression;
apply a second weight to the second expression of interest based upon the second type of expression to generate a second weighted expression of interest;
rank the segments based upon the first weighted expression of interest and the second weighted expression of interest; and
extract one or more segments of the segments based upon rankings of the segments using a starting time and an ending time associated with each of the one or more segments, the starting time different than the ending time.

20. The system of claim 19, the second type of expression corresponding to commenting on the content.

* * * * *